US010721628B2

(12) United States Patent
Xue et al.

(10) Patent No.: US 10,721,628 B2
(45) Date of Patent: Jul. 21, 2020

(54) LOW-LATENCY COMMUNICATION IN SHARED SPECTRUM

(71) Applicant: QUALCOMM Incorporated, San Diego, CA (US)

(72) Inventors: Yisheng Xue, San Diego, CA (US); Aleksandar Damnjanovic, Del Mar, CA (US); Yongbin Wei, La Jolla, CA (US); Tamer Kadous, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/533,230

(22) Filed: Aug. 6, 2019

(65) Prior Publication Data
US 2020/0053739 A1 Feb. 13, 2020

Related U.S. Application Data

(60) Provisional application No. 62/716,825, filed on Aug. 9, 2018.

(51) Int. Cl.
*H04W 16/14* (2009.01)
*H04W 28/26* (2009.01)
(Continued)

(52) U.S. Cl.
CPC ........... *H04W 16/14* (2013.01); *H04W 28/26* (2013.01); *H04W 72/085* (2013.01); *H04W 72/1278* (2013.01); *H04W 74/0808* (2013.01)

(58) Field of Classification Search
CPC ... H04W 72/085; H04W 72/10; H04W 16/14; H04W 28/26; H04W 74/0808;
(Continued)

(56) References Cited

U.S. PATENT DOCUMENTS 6,529,520 B1 * 3/2003 Lee .................... H04L 12/2801
370/442
10,117,261 B2 * 10/2018 Liu .................... H04W 72/1226
(Continued)

OTHER PUBLICATIONS

International Search Report and Written Opinion—PCT/US2019/045503—ISA/EPO—Oct. 28, 2019.

*Primary Examiner* — Magdi Elhag
(74) *Attorney, Agent, or Firm* — Harrity & Harrity, LLP/Qualcomm

(57) ABSTRACT

Various aspects of the present disclosure generally relate to wireless communication. In some aspects, a transmitter device may determine that a communication is to be transmitted on a shared spectrum during a channel access interval not reserved for the communication. The transmitter device may determine, based at least in part on determining that the communication is to be transmitted, that a detection power of a listen-before-talk (LBT) operation satisfies a threshold. The transmitter device may transmit, after a coordinated rate control region and based at least in part on the detection power of the LBT operation satisfying the threshold, a reservation request signal associated with the communication. The transmitter device may transmit the communication before an end of the channel access interval based at least in part on a response to the reservation request signal. Numerous other aspects are provided.

30 Claims, 6 Drawing Sheets

(51) Int. Cl.
*H04W 72/08* (2009.01)
*H04W 74/08* (2009.01)
*H04W 72/12* (2009.01)

(58) Field of Classification Search
CPC ......... H04W 74/0875; H04W 74/0883; H04W 72/1278; H04W 16/16
See application file for complete search history.

(56) References Cited

U.S. PATENT DOCUMENTS

| | | | |
|---|---|---|---|
| 2015/0099525 A1* | 4/2015 | Ji | H04W 72/04 455/450 |
| 2015/0245374 A1* | 8/2015 | Mitola, III | G06Q 30/08 370/329 |
| 2016/0128130 A1 | 5/2016 | Sadek et al. | |
| 2016/0174109 A1* | 6/2016 | Yerramalli | H04W 28/26 370/329 |
| 2016/0212625 A1* | 7/2016 | Damnjanovic | H04W 74/0833 |
| 2017/0041805 A1* | 2/2017 | Chandrasekhar | H04W 74/0816 |
| 2018/0160313 A1* | 6/2018 | Montojo | H04W 16/14 |
| 2018/0184463 A1 | 6/2018 | Fakoorian et al. | |
| 2018/0220379 A1* | 8/2018 | Zhang | H04W 52/243 |
| 2018/0227804 A1* | 8/2018 | Damnjanovic | H04W 74/002 |
| 2018/0255576 A1* | 9/2018 | Bhorkar | H04L 5/00 |
| 2018/0302868 A1* | 10/2018 | Bhorkar | H04W 56/0005 |
| 2019/0104548 A1* | 4/2019 | Fan | H04W 74/0816 |
| 2019/0132103 A1* | 5/2019 | Yang | H04L 5/0037 |
| 2019/0191315 A1* | 6/2019 | Mukherjee | H04W 24/10 |

* cited by examiner

LOW-LATENCY COMMUNICATION IN SHARED SPECTRUM

CROSS-REFERENCE TO RELATED APPLICATIONS UNDER 35 U.S.C. § 119

This application claims priority to U.S. Provisional Patent Application No. 62/716,825, filed on Aug. 9, 2018, entitled "LOW-LATENCY COMMUNICATION IN THE NR SHARED SPECTRUM," which is hereby expressly incorporated by reference herein.

FIELD OF THE DISCLOSURE

Aspects of the present disclosure generally relate to wireless communication, and more particularly to techniques and apparatuses for low-latency communication in shared spectrum (SS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a transmitter device, may include determining that a communication is to be transmitted by the transmitter device on a shared spectrum during a channel access interval, wherein the channel access interval is not reserved for the communication; determining, based at least in part on determining that the communication is to be transmitted, that a detection power of a listen-before-talk (LBT) operation, performed with regard to the channel access interval, satisfies a threshold; transmitting, after a coordinated rate control region and based at least in part on the detection power of the LBT operation satisfying the threshold, a reservation request signal associated with the communication; and transmitting the communication before an end of the channel access interval based at least in part on a response to the reservation request signal.

In some aspects, a method of wireless communication, performed by a receiver device, may include receiving, after a coordinated rate control region of a channel access interval for a shared spectrum, a reservation request signal associated with a communication to be performed by the receiver device in the channel access interval, wherein the channel access interval is not reserved for the communication; transmitting a reservation response signal associated with the reservation request signal; and receiving the communication before an end of the channel access interval in accordance with the reservation request signal.

In some aspects, a transmitter device for wireless communication may include memory and one or more processors operatively coupled to the memory. The memory and the one or more processors may be configured to determine that a communication is to be transmitted by the transmitter device on a shared spectrum during a channel access interval, wherein the channel access interval is not reserved for the communication; determine, based at least in part on determining that the communication is to be transmitted, that a detection power of an LBT operation, performed with regard to the channel access interval, satisfies a threshold; transmit, after a coordinated rate control region and based at least in part on the detection power of the LBT operation satisfying the threshold, a reservation request signal associated with the communication; and transmit the communication before an end of the channel access interval based at least in part on a response to the reservation request signal.

In some aspects, a receiver device for wireless communication may include memory and one or more processors operatively coupled to the memory. The memory and the one or more processors may be configured to receive, after a coordinated rate control region of a channel access interval for a shared spectrum, a reservation request signal associated with a communication to be performed by the receiver device in the channel access interval, wherein the channel access interval is not reserved for the communication; transmit a reservation response signal associated with the reservation request signal; and receive the communication before an end of the channel access interval in accordance with the reservation request signal.

In some aspects, a non-transitory computer-readable medium may store one or more instructions for wireless communication. The one or more instructions, when executed by one or more processors of a receiver device, may cause the one or more processors to: determine that a communication is to be transmitted by the transmitter device on a shared spectrum during a channel access interval, wherein the channel access interval is not reserved for the communication; determine, based at least in part on determining that the communication is to be transmitted, that a detection power of an LBT operation, performed with regard to the channel access interval, satisfies a threshold; transmit, after a coordinated rate control region and based at least in part on the detection power of the LBT operation satisfying the threshold, a reservation request signal associated with the communication; and transmit the communication before an end of the channel access interval based at least in part on a response to the reservation request signal.

In some aspects, a non-transitory computer-readable medium may store one or more instructions for wireless communication. The one or more instructions, when executed by one or more processors of a receiver device, may cause the one or more processors to: receive, after a coordinated rate control region of a channel access interval for a shared spectrum, a reservation request signal associated with a communication to be performed by the receiver device in the channel access interval, wherein the channel access interval is not reserved for the communication; transmit a reservation response signal associated with the reservation request signal; and receive the communication before an end of the channel access interval in accordance with the reservation request signal.

In some aspects, an apparatus for wireless communication may include means for determining that a communication is to be transmitted by the transmitter device on a shared spectrum during a channel access interval, wherein the channel access interval is not reserved for the communication; means for determining, based at least in part on determining that the communication is to be transmitted, that a detection power of an LBT operation, performed with regard to the channel access interval, satisfies a threshold; means for transmitting, after a coordinated rate control region and based at least in part on the detection power of the LBT operation satisfying the threshold, a reservation request signal associated with the communication; and means for transmitting the communication before an end of the channel access interval based at least in part on a response to the reservation request signal.

In some aspects, an apparatus for wireless communication may include means for receiving, after a coordinated rate control region of a channel access interval for a shared spectrum, a reservation request signal associated with a communication to be performed by the receiver device in the channel access interval, wherein the channel access interval is not reserved for the communication; means for transmitting a reservation response signal associated with the reservation request signal; and means for receiving the communication before an end of the channel access interval in accordance with the reservation request signal.

Aspects generally include a method, apparatus, system, computer program product, non-transitory computer-readable medium, user equipment, base station, wireless communication device, transmitter device, receiver device, asynchronous channel access device, SS device, New Radio (NR) SS device, and processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
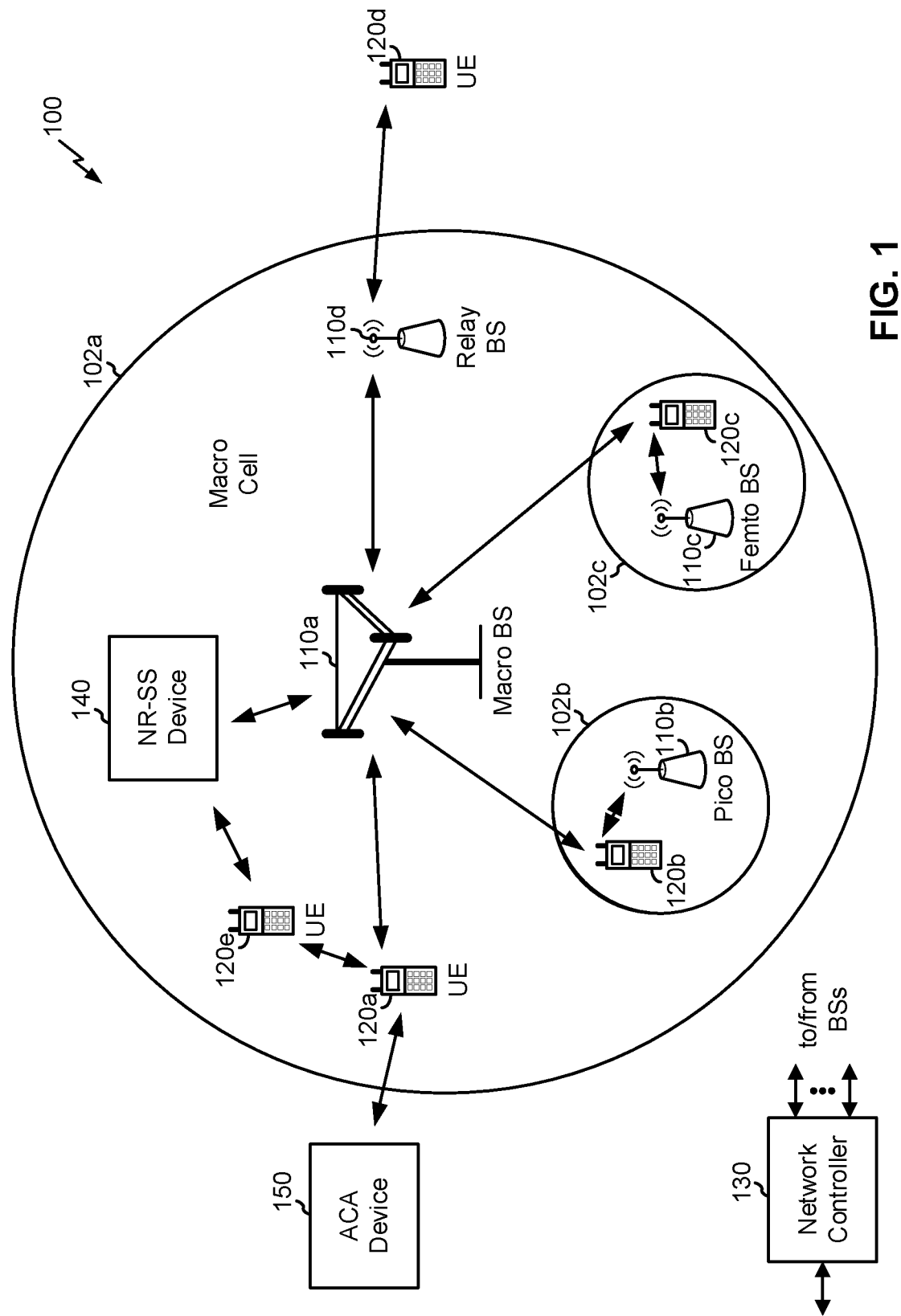
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipments (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As further shown in FIG. 1, wireless network 100 may include one or more New Radio shared spectrum (NR-SS) devices 140. An NR-SS device 140 may include any type of device capable of communicating using a synchronous channel access technology (e.g., a communication scheme, protocol, standard, and/or the like), such as an NR-SS technology or another synchronous channel access technology other than NR-SS. For example, an NR-SS device 140 may be a base station 110, a UE 120, and/or the like. An NR-SS device 140 may be referred to herein as a transmitter device or a receiver device depending on the operations performed by the NR-SS device 140. Additionally, or alternatively, wireless network 100 may include one or more asynchronous channel access (ACA) devices 150. An ACA device 150 may include any type of device capable of communicating using an ACA technology, such as a wireless local area network (WLAN) technology (e.g., a Wi-Fi technology and/or the like), a licensed-assisted access (LAA) technology, an LTE for unlicensed spectrum (LTE-U) technology, a New Radio for unlicensed spectrum (NR-U) technology, and/or the like. For example, an ACA device 150 may be a base station 110, a UE 120, a WLAN access point (e.g., a Wi-Fi access point), and/or the like.

As indicated above, FIG. 1 is provided as an example. Other examples may differ from what is described with regard to FIG. 1.

Figure 2:
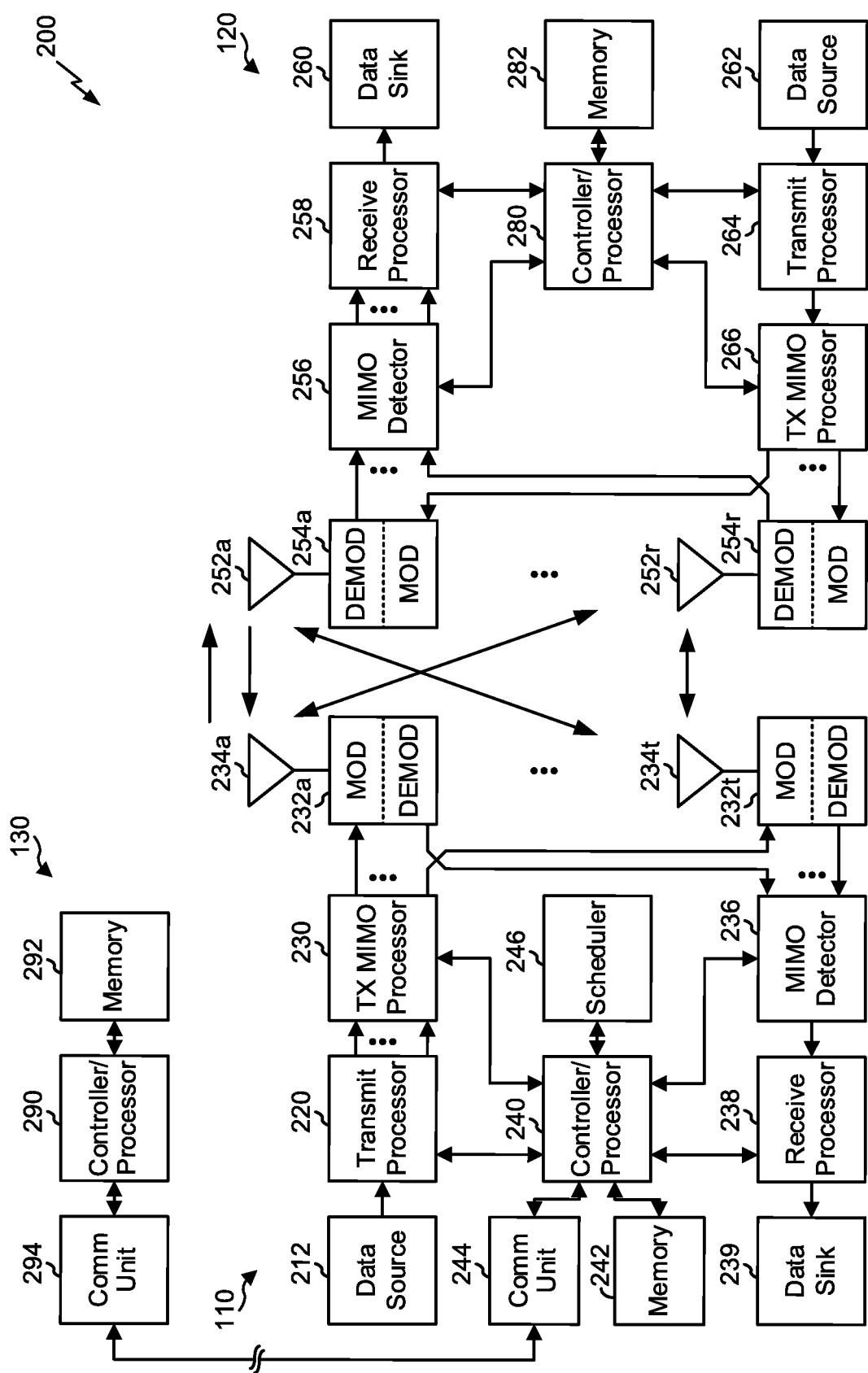
FIG. 2 is a block diagram conceptually illustrating an example of a base station in communication with a user equipment in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with low-latency communication in a shared spectrum, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink. In some aspects, an NR-SS device 140 and/or an ACA device 150 may include one or more components described in connection with FIG. 2 and/or similar components. For example, NR-SS device 140 and/or ACA device 150 may include a memory, one or more processors, one or more schedulers, one or more transmission components, one or more reception components, one or more antennas, and/or the like, the same as or similar to those described in connection with FIG. 2.

In some aspects, a transmitter device (e.g., BS 110, UE 120, NR-SS device 140, ACA device 150, and/or the like) may include means for determining that a communication is to be transmitted by the transmitter device on a shared spectrum during a channel access interval, wherein the channel access interval is not reserved for the communication; means for determining, based at least in part on determining that the communication is to be transmitted, that a detection power of a listen-before-talk (LBT) operation, performed with regard to the channel access interval, satisfies a threshold; means for transmitting, after a coordinated rate control region and based at least in part on the detection power of the LBT operation satisfying the threshold, a reservation request signal associated with the communication; means for transmitting the communication before an end of the channel access interval based at least in part on a response to the reservation request signal; and/or the like. In some aspects, such means may include one or more components of UE 120, BS 110, NR-SS device 140, or ACA device 150, described in connection with FIG. 2.

In some aspects, a receiver device (e.g., BS 110, UE 120, NR-SS device 140, ACA device 150, and/or the like) may include means for receiving, after a coordinated rate control region of a channel access interval for a shared spectrum, a reservation request signal associated with a communication to be performed by the receiver device in the channel access interval, wherein the channel access interval is not reserved for the communication; means for transmitting a reservation response signal associated with the reservation request signal; means for receiving the communication before an end of the channel access interval in accordance with the reservation request signal; and/or the like. In some aspects, such means may include one or more components of BS 110, UE 120, NR-SS device 140, or ACA device 150, described in connection with FIG. 2.

As indicated above, FIG. 2 is provided merely as an example. Other examples may differ from what is described with regard to FIG. 2.

New Radio (NR) may use spectrum sharing to share spectrum between different operators. As one example, a WiFi spectrum, associated with an asynchronous channel access system, may be shared with 5G/NR operators which may use a shared spectrum system, such as NR-SS, to share the spectrum. Some operators may use a contention-based approach for spectrum sharing. For example, a transmitter device that wishes to communicate on a medium (e.g., a shared spectrum) may perform a contention-based handshake, a listen-before-talk (LBT) procedure, and/or the like in order to secure resources of the medium for communication. In such a case, for two operators, the shared spectrum may be associated with alternating channel access intervals, where each channel access interval is associated with one of the two operators. A higher-priority operator (referred to herein as an operator or device associated with a priority condition) may have a first (e.g., earlier) opportunity in a contention interval of the corresponding channel access interval. The priority condition may alternate between the two operators in the alternating channel access intervals. A lower-priority operator may be permitted to use the spectrum only when the contention-based approach indicates that the lower-priority operator would not interrupt or degrade communications of the higher-priority operator for the channel access interval. The lower-priority operator and the higher-priority operator may perform coordinated rate control after the contention procedure to allocate the resources of the shared spectrum for communication.

However, the contention-based approach may pose certain problems for some communications, such as low latency communications. For example, the contention interval may necessarily introduce some latency. Furthermore, in some cases, a need for a communication may arise after the contention interval (e.g., for the lower-priority operator or the higher-priority operator). In such a case, the communication may be forced to wait until the next contention interval, which may violate latency requirements or increase latency, thereby degrading network performance.

Some techniques and apparatuses described herein provide an asynchronous channel access region after a contention window and/or a coordinated rate control region of a channel access interval. A transmitter device that desires to perform an unscheduled communication (e.g., a low-latency communication, a communication to be performed by the transmitter device using a medium that is not reserved for the communication by the transmitter device during the contention window) in the asynchronous channel access region may perform a strict LBT operation to reduce impact of the unscheduled communication with regard to a high-priority operator of the asynchronous channel access region. In this way, low-latency communication may be provided in the shared spectrum, which improves network efficiency and which enables the sharing of spectrum between low-latency UEs and non-low-latency UEs.

Figure 3:
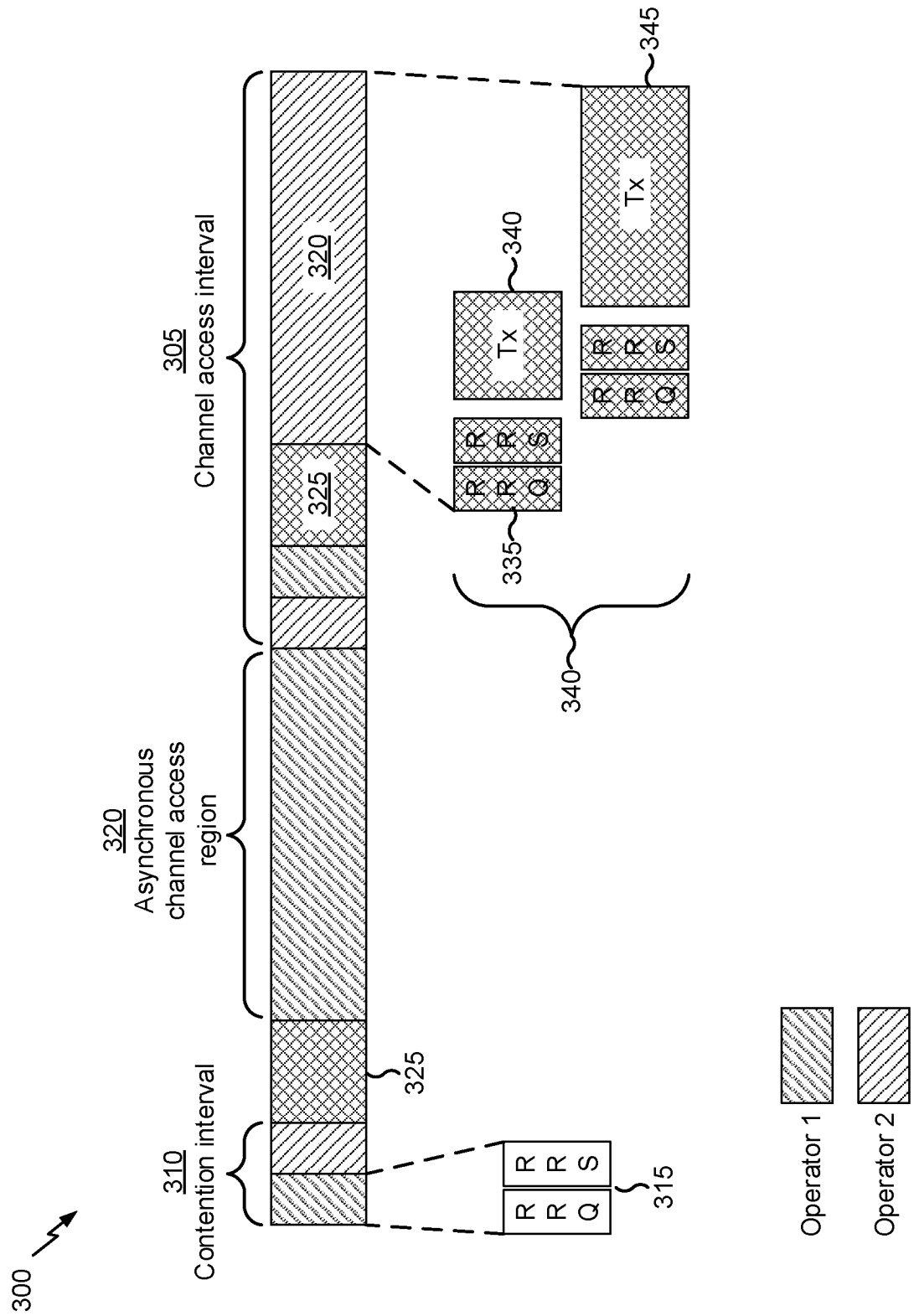
FIG. 3 is a diagram illustrating an example of low-latency communication in a shared spectrum, in accordance with various aspects of the present disclosure.

FIG. 3 is a diagram illustrating an example 300 of communication in a shared spectrum, in accordance with various aspects of the present disclosure. FIG. 3 shows an example of low-latency communication in a shared spectrum. The shared spectrum may include any medium (e.g., band or spectrum) that is shared between two or more operators, such as two or more operators associated with different RATs, two or more operators associated with the same RAT, and/or the like. While the operations described in connection with FIG. 3 and elsewhere herein are performed with regard to two operators (shown as Operator 1 with a forward diagonal hatch and Operator 2 with a backward diagonal hatch), the operations described herein are not so limited. For example, the operations described herein may be performed for any number of operators. In FIG. 3, the horizontal dimension generally represents time, except where explicitly indicated otherwise.

As shown in FIG. 3, and by reference number 305, a shared band may include channel access intervals. FIG. 3 shows two channel access intervals. A channel access interval may be associated with a higher-priority operator and a lower-priority operator. Here, the earlier channel access interval, which starts with a contention interval shown by reference number 310 and ends with an asynchronous channel access region shown by reference number 320, is associated with Operator 1 as a higher-priority operator. The later channel access interval, shown by reference number 305, is associated with Operator 2 as a higher-priority operator. Thus, Operator 1 is associated with a priority condition in the earlier channel access interval and Operator 2 is associated with a priority condition in the later channel access interval.

A transmitter device (e.g., a UE (e.g., UE 120) and/or a BS (e.g., BS 110)) may perform a contention-based operation to transmit in the asynchronous channel access region. For example, in the case of a downlink communication that is not a low-latency communication, when the BS is associated with a priority condition, the BS may transmit a radio resource request (RRQ) to a corresponding UE in the contention interval shown by reference number 310. The UE may transmit a radio resource response (RRS) to the BS to indicate the UE's occupancy of the shared band as a receiver. In the case of a non-low-latency uplink communication, the UE may transmit the RRS and the BS may transmit the RRQ. Since the communication is associated with the higher-priority operator, the RRQ and the RRS may be transmitted in the earlier part of the contention interval associated with the higher-priority operator, as shown by reference number 315. The transmitter of the RRQ (whether the BS or the UE) may be referred to as a transmitter device, and the transmitter of the RRS may be referred to as a receiver device.

When the transmitter device (e.g., the UE or the BS) is associated with the lower-priority operator, the RRQ and the corresponding RRS for the communication may be transmitted in the later part of the contention interval associated with the lower-priority operator. The transmitter device may perform an LBT operation to determine whether a transmitter device or a receiver device associated with the higher-priority operator has transmitted an RRQ or RRS in the earlier part of the contention interval associated with the higher-priority operator. For example, the transmitter device may perform the LBT operation before transmitting the RRQ. Thus, the lower-priority transmitter device may avoid interference with the higher-priority transmitter device for transmission of a non-low-latency communication based at least in part on an LBT operation. A communication for which the RRQ and/or the RRS have been transmitted in the contention interval may be referred to as a communication for which the channel access interval is reserved.

As shown by reference number 320, the channel access interval is associated with an asynchronous channel access region. Here, the asynchronous channel access region is hatched in accordance with the higher-priority operator for each channel access interval, since the higher-priority operator is likely to perform transmission in the asynchronous channel access region due to the higher priority of the higher-priority operator. As shown by reference number 325, each channel access interval may include a coordinated rate control region. Transmitter devices and/or receiver devices associated with the higher-priority operator and the lower-priority operator may coordinate in the coordinated rate control region to determine rates, resource allocations, and/or the like for the asynchronous channel access region.

In some cases, a transmitter device (e.g., a device associated with the higher-priority operator or the lower-priority operator) may determine that an unscheduled communication or a communication for which the channel access interval is not reserved during the contention window is to be transmitted. This communication is referred to hereinafter as a low-latency communication, though it should be understood that the communication may be any type of communication. In some aspects, the transmitter device may determine, after the contention interval has passed, that the low-latency communication is to be transmitted. The operations described in connection with reference numbers 330, 335, and 340 relate to transmission of a low-latency communication in the asynchronous channel access region.

As shown by reference number 330, in some aspects, a transmitter device may transmit an RRQ in an asynchronous channel access region. For example, the transmitter device may determine, after the contention interval has occurred, that a low-latency transmission (shown by reference number 335) is to be performed, meaning that the transmitter device cannot contend for the medium during the contention interval. In such a case, the transmitter device may perform an LBT operation and, based at least in part on a result of the LBT operation, may selectively transmit the RRQ. In some aspects, the transmitter device may perform the LBT operation with regard to the contention interval (e.g., the preceding contention interval) and the channel access interval (e.g., the asynchronous channel access interval). For example, the transmitter device may determine whether a detection power threshold associated with another transmitter device has been satisfied in the contention interval or the channel access interval. One possible value of the detection power threshold may be approximately −72 dBm, although other values are contemplated herein. In some aspects, the LBT operation may be referred to herein as a strict LBT operation. If the detection power threshold is not satisfied (e.g., based at least in part on an RRQ/RRS associated with another communication being transmitted in the shared band or in the resources of the shared band that the transmitter device is to use), then the transmitter device may not transmit the RRQ. In such a case, the transmitter device may identify other resources for which to perform an LBT operation, and may attempt to transmit the low-latency communication using the other resources.

As further shown, the transmitter device may receive (e.g., from a receiver device associated with the transmitter device) an RRS based at least in part on the RRQ. In some aspects, the operations of transmitting the RRS and/or the RRQ may be referred to collectively as performing channel access. As shown, the RRS, the RRQ, and the low-latency transmission are filled with a diamond hatch, indicating that transmitter devices associated with either operator can perform low-latency communication in the asynchronous channel access region. As further shown, the transmitter device may transmit the low-latency communication based at least in part on the RRS. In this way, a low-latency communication is transmitted in the asynchronous channel access region of a shared band, which enables low-latency transmission to UEs or BSs of an operator irrespective of whether the operator is a higher-priority operator for the current channel access interval.

As shown, the channel access region for the low-latency communication is referred to as an asynchronous channel access region. In some aspects, the transmitter device may perform channel access for the low-latency communication at any point in the channel access region. For example, the transmitter device may not be required to perform channel access at a beginning of the asynchronous channel access region or at any particular time in the asynchronous channel access region. In some aspects, the low-latency communication may be symbol-synchronized with a non-low-latency communication. In some aspects, the low-latency communication may not be symbol-synchronized with the non-low-latency communication.

As shown by reference number 340, in some aspects, a transmitter device (or multiple transmitter devices) may perform channel access for multiple low-latency transmissions. Here, channel access for two communications is illustrated by reference number 340. For example, each transmitter device may perform an LBT operation (e.g., a strict LBT operation), may determine that particular resources are available for a low-latency transmission, and may transmit an RRQ for the low-latency transmission. As shown by reference number 345, the low-latency transmission may end before an end of the channel access interval, which prevents interference with a next contention interval. In this way, a transmitter device associated with an operator (e.g., a higher-priority operator or a lower-priority operator) may perform an unscheduled communication in shared spectrum using an asynchronous channel access region, which mitigates interference with non-low-latency communications, improves conformity with low-latency requirements, and improves latency of the network.

As indicated above, FIG. 3 is provided as an example. Other examples may differ from what is described with respect to FIG. 3.

Figure 4:
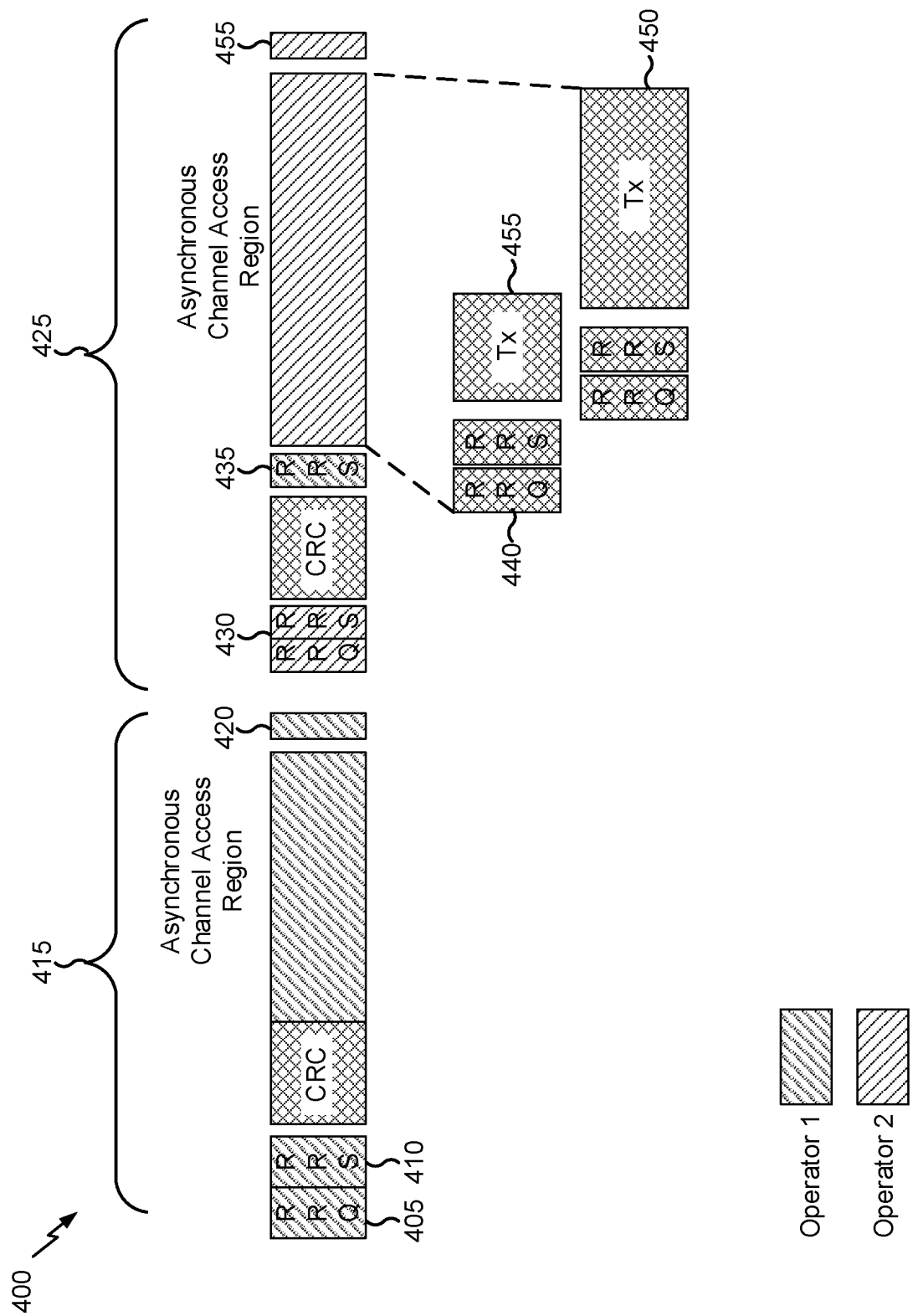
FIG. 4 is a diagram illustrating an example of low-latency communication in a shared spectrum, in accordance with various aspects of the present disclosure.

FIG. 4 is a diagram illustrating an example 400 of low-latency communication in a shared spectrum, in accordance with various aspects of the present disclosure. Example 400 relates to a shared spectrum approach that does not use a contention interval for the higher-priority operator and the lower-priority operator. This shared spectrum approach may be referred to in some cases as a NR shared spectrum slim approach, a slim approach, and/or the like.

As shown in FIG. 4, and by reference number 405, a transmitter device associated with Operator 1 may transmit an RRQ to a receiver device. As shown by reference number 410, the receiver device associated with Operator 1 may transmit an RRS associated with the RRQ. For example, the transmitter device and the receiver device may transmit the RRQ and the RRS at a beginning of the first channel access interval shown by reference number 415.

As further shown, in example 400, no contention interval for Operator 2 (e.g., the lower-priority operator) is provided in the first channel access interval. In the slim approach, a tentative grant for transmission resources of the lower-priority operator is received in the previous channel access interval. For example, a tentative grant for Operator 1 for the second channel access interval (associated with Operator 2 as a higher-priority operator and shown by reference number 425) is shown by reference number 420. If a transmitter device of Operator 1 is to transmit a non-low-latency transmission in the second channel access interval, the transmitter device of Operator 1 may first perform an LBT operation (e.g., a strict LBT operation and/or the like) with regard to the transmission resources identified by the tentative grant, then may transmit the non-low-latency transmission when no transmission associated with the higher-priority operator (e.g., Operator 2) has preempted the transmission resources. As shown by reference number 430, a transmitter device and a receiver device associated with Operator 2 may transmit an RRQ and a corresponding RRS in the second channel access interval.

As shown by reference number 435, in some aspects, a receiver device associated with a lower-priority operator (e.g., Operator 1 in the second channel access interval) may transmit an RRS. The RRS may indicate that the receiver device is configured to receive a communication (e.g., a non-low-latency communication) in the second channel interval. In this way, the receiver device may indicate, to a corresponding transmitter device of the lower-priority operator, that a non-low-latency communication can be provided to the receiver device. Furthermore, the RRS for the non-low-latency communication may indicate, to a transmitter device performing an LBT operation for a subsequent low-latency communication, that resources of the receiver device are not to be interrupted for low-latency communication. A communication for which the RRQ and/or the RRS have been transmitted in the contention interval for the operator associated with the priority condition, or in accordance with the grant 420 may be referred to as a communication for which the channel access interval is reserved.

As shown by reference number 440, a transmitter device of either operator (e.g., the lower-priority operator or the higher-priority operator) may transmit an RRQ, and a corresponding receiver device may transmit an RRS, after the coordinated rate control region of the second channel access interval. For example, the transmitter device of either operator may determine that a low-latency communication 435 is to be transmitted in the asynchronous channel access region of the second channel access interval. In some aspects, the transmitter device may perform an LBT operation (e.g., a strict LBT operation) with regard to a previously-received part of the second channel access interval. For example, the transmitter device of either operator may perform the LBT operation with regard to the RRQ and the RRS shown by reference number 420, the cooperative rate control region, and the RRS shown by reference number 425. By providing the RRS after the cooperative rate control region, the corresponding receiver device enables more accurate determination of traffic conditions in the second channel access interval.

When the transmitter device determines that a detection power of the LBT operation satisfies a threshold, the transmitter device may transmit the RRQ. A corresponding receiver device may transmit the RRS, based at least in part on the RRQ, indicating that the corresponding receiver device can receive the low-latency communication, or indicating occupancy of the shared band by the receiver device.

As shown by reference number 445, the transmitter device may transmit the low-latency communication. As shown by reference number 450, in some aspects, all low-latency communications may conclude before an end of the asynchronous channel access region, thereby reducing interference with a later channel access interval. As shown by reference number 455, a tentative grant for Operator 2 for the later channel access interval may be transmitted. In this way, low-latency transmission for a slim approach (e.g., which may not include a contention interval) may be provided, thereby improving conformity with low-latency requirements.

As indicated above, FIG. 4 is provided as an example. Other examples may differ from what is described with respect to FIG. 4.

Figure 5:
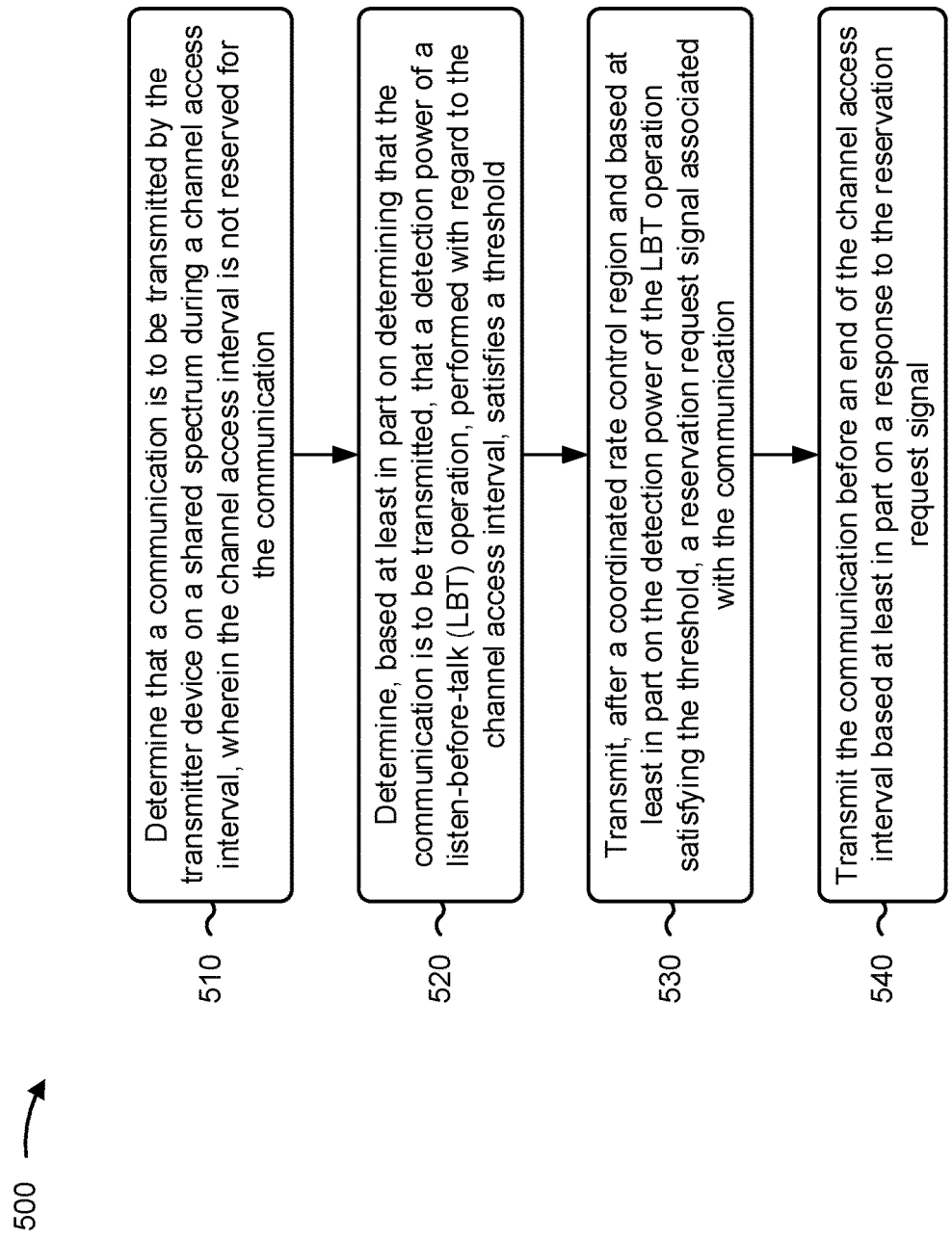
FIG. 5 is a diagram illustrating an example process performed, for example, by a transmitter device, in accordance with various aspects of the present disclosure.

FIG. 5 is a diagram illustrating an example process 500 performed, for example, by a transmitter device, in accordance with various aspects of the present disclosure. Example process 500 is an example where a transmitter device (e.g., UE 120, BS 110, NR-SS device 140, and/or the like) performs operations associated with spectrum sharing for unscheduled communications.

As shown in FIG. 5, in some aspects, process 500 may include determining that a communication is to be transmitted by the transmitter device on a shared spectrum during a channel access interval, wherein the channel access interval is not reserved for the communication (block 510). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may determine that a communication is to be transmitted by the transmitter device on a shared spectrum during a channel access interval, as described above. In some aspects, the channel access interval is not reserved for the communication. For example, contention for the communication may not have been performed during a contention interval of the channel access interval, or channel access for the communication may not have been performed.

As further shown in FIG. 5, in some aspects, process 500 may include determining, based at least in part on determining that the communication is to be transmitted, that a detection power of a listen-before-talk (LBT) operation, performed with regard to the channel access interval, satisfies a threshold (block 520). For example, the transmitter device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may determine, based at least in part on determining that the communication is to be transmitted, that a detection power of an LBT operation (e.g., a strict LBT operation and/or the like), performed with regard to the channel access interval, satisfies a threshold, as described above.

As further shown in FIG. 5, in some aspects, process 500 may include transmitting, after a coordinated rate control region and based at least in part on the detection power of the LBT operation satisfying the threshold, a reservation request signal associated with the communication (block 530). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit, after a coordinated rate control region and based at least in part on the detection power of the LBT operation satisfying the threshold, a reservation request signal associated with the communication, as described above.

As further shown in FIG. 5, in some aspects, process 500 may include transmitting the communication before an end of the channel access interval based at least in part on a response to the reservation request signal (block 540). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit the communication before an end of the channel access interval based at least in part on a response to the reservation request signal, as described above.

Process 500 may include additional aspects, such as any single aspect or any combination of aspects described below and/or in connection with one or more other processes described elsewhere herein.

In a first aspect, the determination that the communication is to be transmitted by the transmitter device occurs after a contention interval of the channel access interval.

In a second aspect, alone or in combination with the first aspect, the communication is concluded before an end of the channel access interval.

In a third aspect, alone or in combination with one or more of the first and second aspects, the communication is asynchronous with a start of the channel access interval.

In a fourth aspect, alone or in combination with one or more of the first through third aspects, the communication comprises a low-latency communication.

In a fifth aspect, alone or in combination with one or more of the first through fourth aspects, the channel access interval is associated with a first operator that is associated with a priority condition for the channel access interval. In some aspects, the transmitter device is associated with a second operator.

In a sixth aspect, alone or in combination with one or more of the first through fifth aspects, the channel access interval is associated with an operator that is associated with a priority condition for the channel access interval. In some aspects, the transmitter device is associated with the operator.

In a seventh aspect, alone or in combination with one or more of the first through sixth aspects, the LBT operation is performed with regard to a contention interval of the channel access interval, and the channel access interval.

In an eighth aspect, alone or in combination with one or more of the first through seventh aspects, the receiver device comprises a New Radio shared spectrum device.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
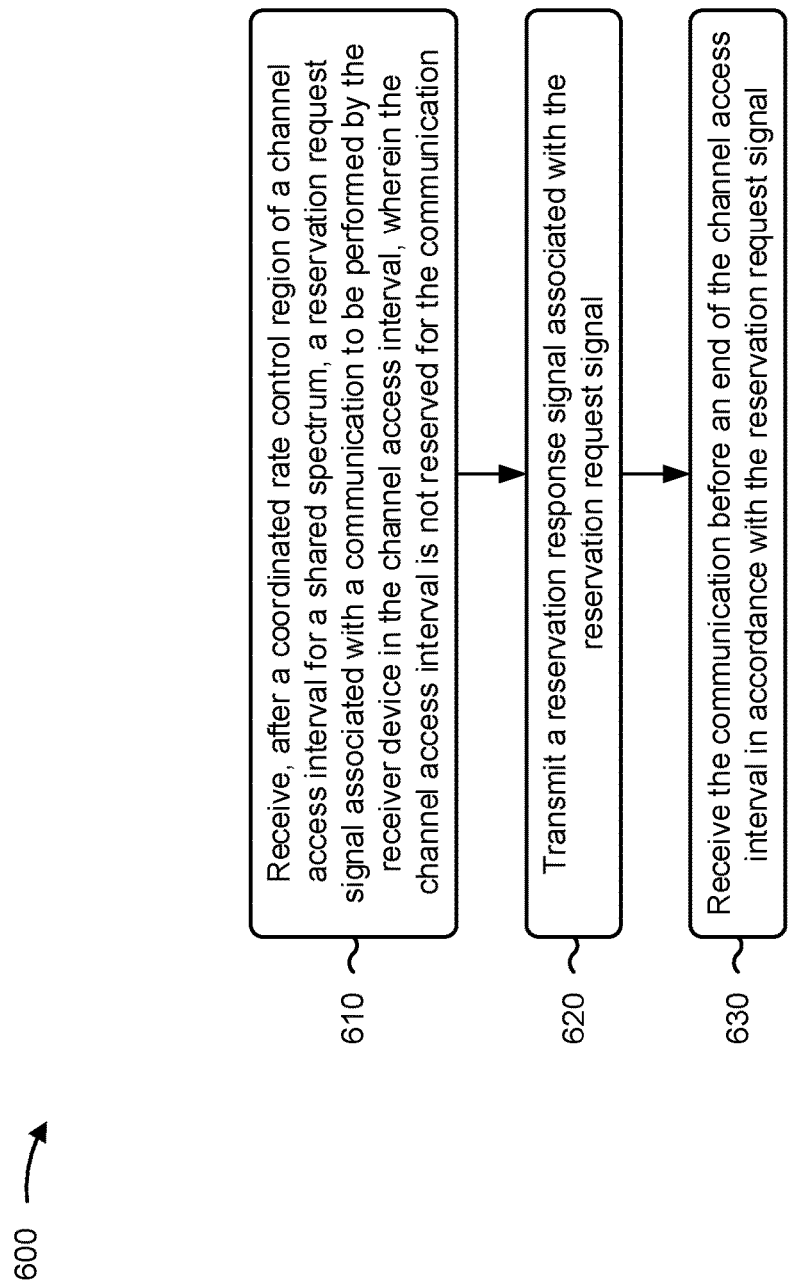
FIG. 6 is a diagram illustrating an example process performed, for example, by a receiver device, in accordance with various aspects of the present disclosure.

FIG. 6 is a diagram illustrating an example process 600 performed, for example, by a receiver device, in accordance with various aspects of the present disclosure. Example process 600 is an example where a receiver device (e.g., UE 120, BS 110, NR-SS device 140, and/or the like) performs operations associated with spectrum sharing for unscheduled communications.

As shown in FIG. 6, in some aspects, process 600 may include receiving, after a coordinated rate control region of a channel access interval for a shared spectrum, a reservation request signal associated with a communication to be performed by the receiver device in the channel access interval, wherein the channel access interval is not reserved for the communication (block 610). For example, the receiver device (e.g., using antenna 234, DEMOD 232, MIMO detector 236, receive processor 238, controller/processor 240, controller/processor 280, transmit processor 264, TX MIMO processor 266, MOD 254, antenna 252, and/or the like) may receive, after a coordinated rate control region of a channel access interval for a shared spectrum, a reservation request signal associated with a communication to be performed by the receiver device in the channel access interval, as described above. In some aspects, the channel access interval is not reserved for the communication.

As further shown in FIG. 6, in some aspects, process 600 may include transmitting a reservation response signal associated with the reservation request signal (block 620). For example, the receiver device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit a reservation response signal associated with the reservation request signal, as described above.

As further shown in FIG. 6, in some aspects, process 600 may include receiving the communication before an end of the channel access interval in accordance with the reservation request signal (block 630). For example, the receiver device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive the communication before an end of the channel access interval in accordance with the reservation request signal, as described above.

Process 600 may include additional aspects, such as any single aspect or any combination of aspects described below and/or in connection with one or more other processes described elsewhere herein.

In a first aspect, a determination that the communication is to be performed occurs after a contention interval of the channel access interval.

In a second aspect, alone or in combination with the first aspect, the reservation request signal is based at least in part on a detection power of a listen-before-talk (LBT) operation, performed with regard to the channel access interval, satisfying a threshold.

In a third aspect, alone or in combination with one or more of the first and second aspects, the LBT operation is performed with regard to a contention interval of the channel access interval and the channel access interval.

In a fourth aspect, alone or in combination with one or more of the first through third aspects, the communication is concluded before an end of the channel access interval.

In a fifth aspect, alone or in combination with one or more of the first through fourth aspects, the communication is asynchronous with a start of the channel access interval.

In a sixth aspect, alone or in combination with one or more of the first through fifth aspects, the communication comprises a low-latency communication.

In a seventh aspect, alone or in combination with one or more of the first through sixth aspects, the channel access interval is associated with a first operator that is associated with a priority condition for the channel access interval. In some aspects, the receiver device is associated with a second operator.

In an eighth aspect, alone or in combination with one or more of the first through seventh aspects, the channel access interval is associated with an operator that is associated with a priority condition for the channel access interval. In some aspects, the receiver device is associated with the operator.

In a ninth aspect, alone or in combination with one or more of the first through eighth aspects, the receiver device comprises a New Radio shared spectrum device.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a transmitter device, comprising:
   determining that a communication is to be transmitted by the transmitter device on a shared spectrum during a channel access interval, the channel access interval not being reserved for the communication;
   determining, based at least in part on determining that the communication is to be transmitted, that a detection power of a listen-before-talk (LBT) operation, performed with regard to a contention interval of the channel access interval and a coordinated rate control region of the channel access interval, satisfies a threshold,
   devices, associated with a plurality of operators and including the transmitter device, coordinate in the coordinated rate control region to determine at least one of rates or resource allocations for a channel access region of the channel access interval;
   transmitting, after the coordinated rate control region and based at least in part on the detection power of the LBT operation satisfying the threshold, a reservation request signal associated with the communication; and
   transmitting the communication before an end of the channel access interval based at least in part on a response to the reservation request signal.

2. The method of claim 1, wherein the determination that the communication is to be transmitted by the transmitter device occurs after the contention interval of the channel access interval.

3. The method of claim 1, wherein the communication is concluded before an end of the channel access interval.

4. The method of claim 1, wherein the communication is asynchronous with a start of the channel access interval.

5. The method of claim 1, wherein the communication comprises a low-latency communication.

6. The method of claim 1, wherein the channel access interval is associated with a first operator that is associated with a priority condition for the channel access interval, and wherein the transmitter device is associated with a second operator.

7. The method of claim 1, wherein the channel access interval is associated with an operator that is associated with a priority condition for the channel access interval, and wherein the transmitter device is associated with the operator.

8. The method of claim 1, wherein the transmitter device comprises a New Radio shared spectrum device.

9. A method of wireless communication performed by a receiver device, comprising:
   receiving, after a coordinated rate control region of a channel access interval for a shared spectrum, a reservation request signal associated with a communication to be performed by the receiver device in the channel access interval, the channel access interval not being reserved for the communication,
      the reservation request signal being based at least in part on a detection power of a listen-before-talk (LBT) operation, performed with regard to a contention interval of the channel access interval and the coordinated rate control region of the channel access interval, satisfying a threshold, and
      devices, associated with a plurality of operators and including the receiver device, coordinate in the coordinated rate control region to determine at least one of rates or resource allocations for a channel access region of the channel access interval;
   transmitting a reservation response signal associated with the reservation request signal; and
   receiving the communication before an end of the channel access interval in accordance with the reservation request signal.

10. The method of claim 9, wherein a determination that the communication is to be performed occurs after the contention interval of the channel access interval.

11. The method of claim 9, wherein the communication is concluded before an end of the channel access interval.

12. The method of claim 9, wherein the communication is asynchronous with a start of the channel access interval.

13. The method of claim 9, wherein the communication comprises a low-latency communication.

14. The method of claim 9, wherein the channel access interval is associated with a first operator that is associated with a priority condition for the channel access interval, and wherein the receiver device is associated with a second operator.

15. The method of claim 9, wherein the channel access interval is associated with an operator that is associated with a priority condition for the channel access interval, and wherein the receiver device is associated with the operator.

16. The method of claim 9, wherein the receiver device comprises a New Radio shared spectrum device.

17. A transmitter device for wireless communication, comprising:
   a memory; and
   one or more processors operatively coupled to the memory, the memory and the one or more processors configured to:
      determine that a communication is to be transmitted by the transmitter device on a shared spectrum during a channel access interval, the channel access interval not being reserved for the communication;
      determine, based at least in part on determining that the communication is to be transmitted, that a detection power of a listen-before-talk (LBT) operation, performed with regard to a contention interval of the channel access interval and a coordinated rate control region of the channel access interval, satisfies a threshold,
         devices, associated with a plurality of operators and including the transmitter device, coordinate in the coordinated rate control region to determine at least one of rates or resource allocations for a channel access region of the channel access interval;
      transmit, after the coordinated rate control region and based at least in part on the detection power of the LBT operation satisfying the threshold, a reservation request signal associated with the communication; and
      transmit the communication before an end of the channel access interval based at least in part on a response to the reservation request signal.

18. The transmitter device of claim 17, wherein the determination that the communication is to be transmitted by the transmitter device occurs after the contention interval of the channel access interval.

19. The transmitter device of claim 17, wherein the communication is concluded before an end of the channel access interval.

20. The transmitter device of claim 17, wherein the communication is asynchronous with a start of the channel access interval.

21. The transmitter device of claim 17, wherein the communication comprises a low-latency communication.

22. The transmitter device of claim 17, wherein the transmitter device comprises a New Radio shared spectrum device.

23. A receiver device for wireless communication, comprising:
   a memory; and
   one or more processors operatively coupled to the memory, the memory and the one or more processors configured to:
      receive, after a coordinated rate control region of a channel access interval for a shared spectrum, a reservation request signal associated with a communication to be performed by the receiver device in the channel access interval, the channel access interval not being reserved for the communication,
         the reservation request signal being based at least in part on a detection power of a listen-before-talk (LBT) operation, performed with regard to a contention interval of the channel access interval and the coordinated rate control region of the channel access interval, satisfying a threshold, and
         devices, associated with a plurality of operators and including the receiver device, coordinate in the coordinated rate control region to determine at least one of rates or resource allocations for a channel access region of the channel access interval;

transmit a reservation response signal associated with the reservation request signal; and receive the communication before an end of the channel access interval in accordance with the reservation request signal.

24. The receiver device of claim 23, wherein a determination that the communication is to be performed occurs after the contention interval of the channel access interval.

25. The receiver device of claim 23, wherein the communication is concluded before an end of the channel access interval.

26. The receiver device of claim 23, wherein the communication is asynchronous with a start of the channel access interval.

27. The receiver device of claim 23, wherein the communication comprises a low-latency communication.

28. The receiver device of claim 23, wherein the channel access interval is associated with a first operator that is associated with a priority condition for the channel access interval, and wherein the receiver device is associated with a second operator.

29. The receiver device of claim 23, wherein the channel access interval is associated with an operator that is associated with a priority condition for the channel access interval, and wherein the receiver device is associated with the operator.

30. The receiver device of claim 23, wherein the receiver device comprises a New Radio shared spectrum device.

\* \* \* \* \*